United States Patent
Ho et al.

(10) Patent No.: US 6,870,296 B2
(45) Date of Patent: Mar. 22, 2005

(54) ELECTRIC MOTOR

(75) Inventors: Seung Pun Ho, Hong Kong (CN); Chi Wai Derek Yuen, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/630,715

(22) Filed: Jul. 31, 2003

(65) Prior Publication Data

US 2004/0027028 A1 Feb. 12, 2004

(30) Foreign Application Priority Data

Aug. 6, 2002  (GB) .............................................. 0218198

(51) Int. Cl.$^7$ .............................................. H02K 39/16
(52) U.S. Cl. ..................... 310/235; 310/43; 310/233; 310/234; 310/62; 310/64; 310/40 MM
(58) Field of Search ................................ 310/233, 234, 310/62–64, 43, 40 MM

(56) References Cited

U.S. PATENT DOCUMENTS

| | | | |
|---|---|---|---|
| 4,859,893 A | * | 8/1989 | Wang .......................... 310/234 |
| 5,053,657 A | * | 10/1991 | Ikegami et al. ................ 310/63 |
| 5,095,239 A | * | 3/1992 | Wang ........................... 310/64 |
| 5,679,996 A | * | 10/1997 | Strobl ......................... 310/234 |

FOREIGN PATENT DOCUMENTS

| | | | |
|---|---|---|---|
| GB | 2 128 818 B | 5/1984 | |
| GB | 2128818 B | * 2/1986 | ........... H01L/41/08 |
| GB | 2 189 944 B | 11/1987 | |
| GB | 2 199 195 A | 6/1988 | |
| GB | 2 202 686 A | 9/1988 | |
| GB | 2189944 B | * 6/1990 | ............. H02K/9/04 |

* cited by examiner

Primary Examiner—Darren Schuberg
Assistant Examiner—Yahveh Comas
(74) Attorney, Agent, or Firm—Birch, Stewart, Kolasch & Birch, LLP

(57) ABSTRACT

A miniature PMDC motor has a wound rotor 15 comprising a rotor core 16 and a commutator 17 mounted on a shaft 14. A cooling fan 20 is directly mounted onto the commutator 17 by use of a mechanical snap-fit type connection. Projections 29 on the commutator mate with recesses in the fan 20 to prevent relative rotational movement and detents including resilient fingers 23 and projection surfaces 34 hold the fan axially.

6 Claims, 3 Drawing Sheets

ELECTRIC MOTOR

This nonprovisional application claims priority under 35 U.S.C. § 119(a) on Patent Appication No(s). 0218198.0 filed in Great Britain on Aug. 6, 2002, which is (are) herein incorporated by reference.

BACKGROUND OF THE INVENTION

This invention relates to electric motors and in particular, to a miniature electric motor having an internal cooling fan.

Miniature electric motors with internal cooling fans are well known with the fan providing a source of cooling air flow through the motor so that the motor can run at a higher current rating or power than it could be otherwise.

In a miniature electric motor, and in particular, miniature PMDC motors with wound rotors, the fans are attached directly to the armature core, as shown in GB 2189944 for example or they may be mounted directly onto the commutator about the terminals or tangs. Commutator mounted fans are made of more expensive thermoset plastic to withstand the high temperatures of the commutator which can be especially high under stall conditions when the rotor is locked, resulting in no cooling air flow from the fan.

The armature core fan can be made of cheaper thermoplastic as it is not in direct contact with the commutator and thus, does not have to withstand such high temperatures.

In a PMDC motor with a wound rotor in which the rotor windings are connected to the commutator by way of Insulation Displacing Terminals (IDT) as shown for example, in GB 2128818, lead wires are strung across recesses in a crown or terminal portion of a base of the commutator into which at least the terminals of the commutator segments are inserted. The terminal portion, however, provides a big impediment to cooling air flow across the commutator surface generated by a fan fixed to the rotor core due to the physical size and location of the terminal portion.

Thus, there is a need for an internal cooling fan arrangement within a miniature electric motor having a commutator with insulation displacing terminals which has or can readily receive/support an internal cooling fan for the motor.

SUMMARY OF THE INVENTION

Accordingly the present invention provides an electric motor having a wound rotor and a stator, the rotor having a rotor core mounted on a shaft, a commutator mounted on the shaft adjacent one end of the rotor core and rotor windings wound around the rotor core and connected to terminals of the commutator, and a fan for generating a flow of cooling air, wherein the commutator has a base and a plurality of commutator segments fixed to the base, each segment having a brush contact portion and a terminal and the base having a support portion supporting the brush contact portion of the segments and a terminal portion supporting the terminals and wherein the fan has an integral inner collar from which a plurality of fan blades extend, the collar being fitted to the terminal portion.

Preferably, the collar is fixed to the terminal portion by complementary formations, including snap-fit detents.

BRIEF DESCRIPTION OF THE DRAWINGS

Two preferred embodiments of the invention will now be described, by way of example only, with reference to the accompanying drawings, in which.

DETAILED DESCRIPTION OF THE PREFERRED EMBODIMENTS

Figure 1:
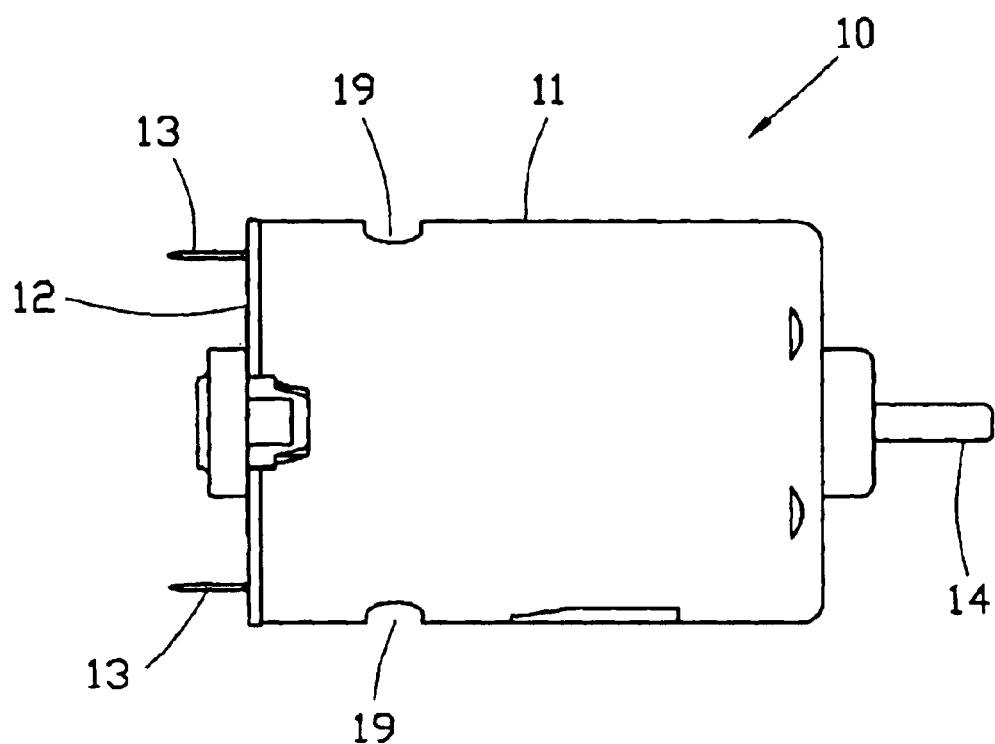
FIG. 1 is a side view of a motor according to a first embodiment of the present invention.

FIG. 1 shows, in side view, a small PMDC motor 10 representing the preferred embodiment of the invention. The motor has a deep drawn metal rear housing 11 supporting a permanent magnet stator. The open end of the housing is closed by an end cap 12 which supports motor terminals 13 and brushes. The housing 11 has ventilation apertures 19. A wound rotor or armature cooperates with the stator. The motor has a shaft 14 journalled in bearings fitted to the end cap 12 and closed end of the housing.

Figure 2:
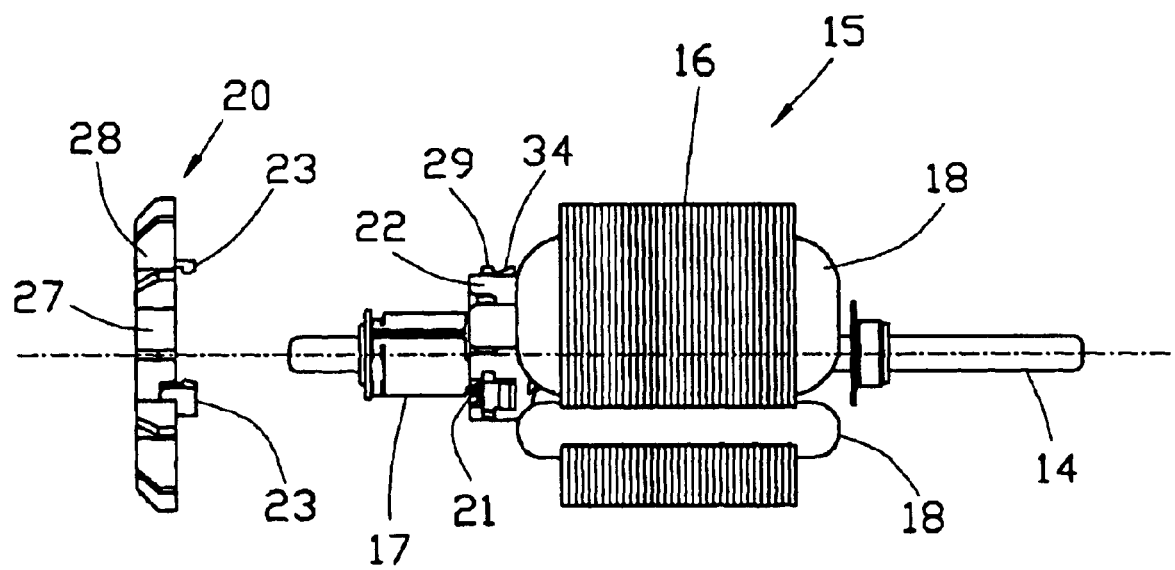
FIG. 2 is an elevation view of a rotor of the motor of FIG. 1 with an exploded fan.

The rotor 15 is shown in FIG. 2. The rotor 15 comprises rotor core 16 mounted on the shaft 14. A commutator 17 is mounted on the shaft 14 at one end of the core 16 adjacent the end cap 12 so that the brushes make sliding contact with the commutator 17. Windings 18 are wound around poles of the rotor core 16 and electrically terminated on the commutator 17. A fan 20 is fitted to the commutator 17.

As shown in FIG. 2, the fan 20 is fitted to the commutator 17 after the rotor 15 has been wound. This allows the rotor to be wound and balanced without interference by the fan 20. The fan 20 is pressed onto the commutator 17, in particular on to the part which supports the commutator terminals 21, known as the terminal portion 22, and is held in place by snap fit fingers 23.

Figure 3:
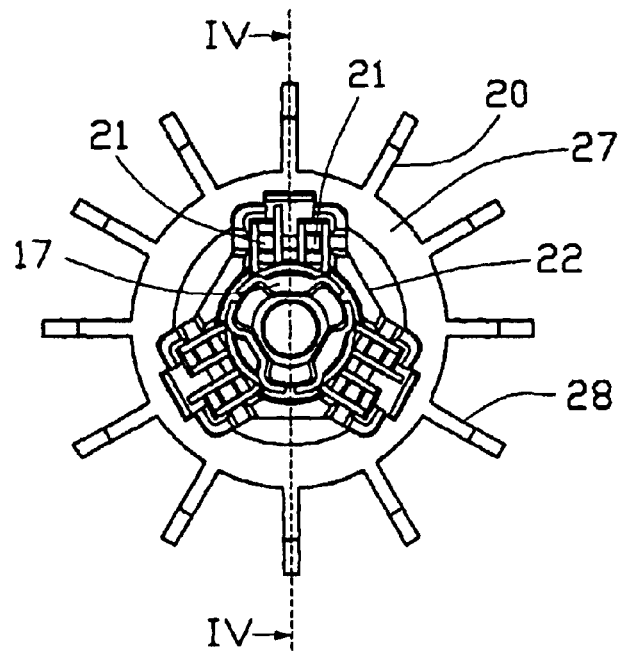
FIG. 3 is an end view of the rotor of FIG. 2 with the fan fitted.
Figure 4:
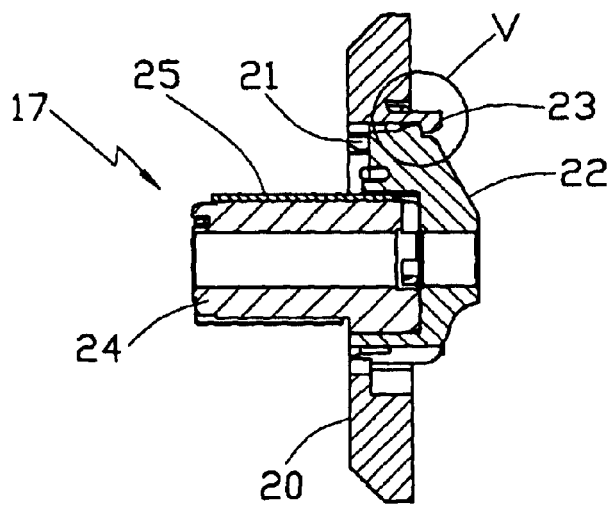
FIG. 4 is a sectional view of a portion of the rotor of FIG. 3.
Figure 5:
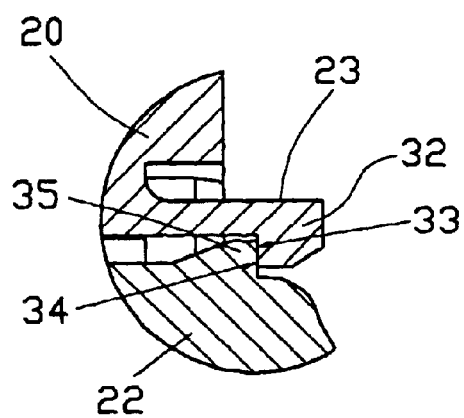
FIG. 5 is an enlarged sectional view of a part of FIG. 4.

An end view of the commutator 17 and fan 20 assembly is shown in FIG. 3. FIG. 4 is a cross-section of the assembly viewed along section line IV-IV of FIG. 3 and FIG. 5 shows in detail a simple snap fit finger arrangement as indicated by circle V in FIG. 4.

The commutator 17 is a two part, mechanical connection or insulation displacing type commutator. The support is in two parts, a cylindrical sleeve 24 supporting the commutator segments 25 and the terminal portion 22 which supports lead wires from the windings 18 as well as receiving the sleeve 24 and the terminals 21 of the commutator segments 25. The terminals 21 are insulation displacing terminals which have an axial slot forming two arms which straddle and grip respective lead wires to make electrical connection therewith as the two parts are pressed together.

Figure 6:
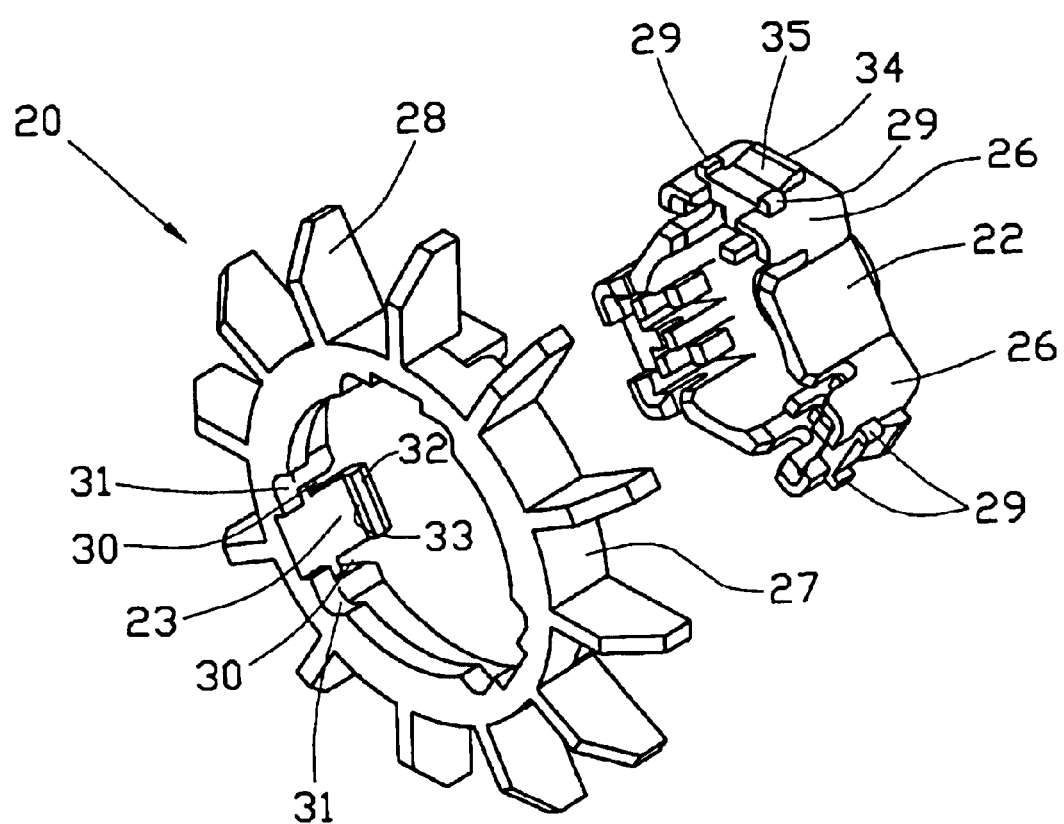
FIG. 6 is an exploded pictorial view of the fan and a terminal portion of the rotor of FIG. 2.

An exploded perspective view of the fan 20 and the terminal portion 22 in shown in FIG. 6. The terminal portion 22 has a plurality of housings 26 which receive the terminals and support the lead wires as the terminals are pressed into the housings 26 and onto the lead wires. The fan 20 is of the centrifugal type and has an inner annular ring or collar 27 from which fan blades 28 extend radially outwardly. The blades 28 are shown as flat blades designed for use in either direction of rotation.

The collar 27 is keyed to the terminal portion 22 by projections 29 on the housing which engage slots 30 in the collar 27 of the fan. This stops the fan 20 rotating about the terminal portion 22 and limits axial movement of the fan 20 towards the motor core 16. Larger cut-outs 31 in the collar 27 snugly accepts the housing giving additional rotational integrity. Resiliently deformable fingers 23 extend axially from the slots 30. The distal end of the fingers has a tapered head 32 with a square shoulder 33.

The shoulder 33 engages a corresponding abutment 34 on a small projection 35 on the housings 26 when the fan is pressed into position to prevent removal or axial movement of the fan 20 with regard to the commutator housing 26 in a direction away from the rotor core. The projection may have an axially outer surface which is tapered to assist the tapered head of the finger 23 to resiliently deflect the finger over the projection 35 during assembly. An enlarged detail view is shown in FIG. 5.

The fan blades 28 are shown with a chamfer on their outer edge. This chamfer is to avoid components or structures within the motor, such as posts for holding the brushes or if on the other side, it may be to avoid the stator magnets.

ADVANTAGE OF THE INVENTION

The use of a snap fit fan attached to the commutator allows the rotor to be completely wound and balanced and the commutator to be dressed before the fan is added to the rotor. Although this is usual, the snap fit fan, being a molded part can be balanced by design and requires no other parts to fix the fan to the commutator which may otherwise affect the balance of the rotor. Prior art fans which were pressed onto the rotor core winding slots still required glue to ensure reliable attachment. The glue is a source of unbalance as its location and volume varies with each application. GB 2189944 also disclosed a snap fit fan but this requires a separate mounting plate to be fixed to the rotor core before the rotor is wound. This is an additional part and it does complicate the winding procedures.

The embodiments described above are given by way of example only and various modifications will be apparent to persons skilled in the art without departing from the scope of the invention as defined in the appended claims.

While a cylindrical mechanical connection type commutator with a two part base has been used to demonstrate the invention, application of the invention is not so limited and can be applied to commutators with a one part base and with any type of contact material including copper, silver and carbon.

The cooling fan is directly mounted on a radially outer portion of the commutator base which supports the commutator terminals. The mounting is mechanical without the use of adhesive or glue. The assembly process is simple, reliable and robust.

What is claimed is:

1. An electric motor having a wound rotor and a stator,
   the rotor having a rotor core mounted on a shaft, a commutator mounted on the shaft adjacent one end of the rotor core and rotor windings wound around the rotor core and connected to terminals of the commutator, and a fan for generating a flow of cooling air,
   wherein the commutator has a base and a plurality of commutator segments fixed to the base, each segment having a brush contact portion and a terminal and the base having a support portion supporting the brush contact portion of the segments and a terminal portion, separate from the support portion, supporting the terminals and wherein the fan has an integral inner collar from which a plurality of fan blades extend, the collar being circumferentially fitted to the terminal portion of the base of the commutator.

2. The motor of claim 1, wherein the collar is fixed to the terminal portion by complementary formations including snap-fit detents.

3. The motor of claim 2, wherein the complementary formations further include blade like projections extending radially from the terminal portion which engage slots in the collar to prevent circumferential movement of the collar about the terminal portion.

4. The motor of claim 3, wherein the terminal portion has a plurality of housings accommodating the terminals and the snap-fit detents include at least one projection formed on each housing.

5. The motor of claim 1, wherein the terminals of the commutator segments are insulation displacing type terminals and the terminal portion has a plurality of housings in which the terminals and lead wires of the rotor windings are received.

6. The motor of claim 1, wherein the commutator is a cylindrical type commutator.

\* \* \* \* \*